Oct. 9, 1923.

R. J. MURRAY

RIM TOOL

Filed June 24, 1921

1,470,095

Inventor
Roland J. Murray
By William C. Sinton
Attorney

Patented Oct. 9, 1923.

1,470,095

UNITED STATES PATENT OFFICE.

ROLAND J. MURRAY, OF FREDERICTON, NEW BRUNSWICK, CANADA.

RIM TOOL.

Application filed June 24, 1921. Serial No. 480,200.

*To all whom it may concern:*

Be it known that I, ROLAND J. MURRAY, a subject of the King of Great Britain, residing at Fredericton, in the Province of New Brunswick, Canada, have invented certain new and useful Improvements in Rim Tools; and I do hereby declare that the following is a full, clear, and exact description of the invention, such as will enable others skilled in the art to which it appertains to make and use the same.

The present invention relates to new and useful improvements in rim tools, for automobiles and the like.

The primary object of the invention is the provision of a rim tool including a pair of gripping members, adapted to engage the opposite sides of the demountable rim of an automobile tire or the like for the purpose of contracting the sides thereof and permitting the ready removal therefrom or the application of a tire thereto.

Another object of the invention is the provision of a rim tool such as above referred to, having a pair of sections movable to and from each other with an operating member secured to one section and engaging the opposite section for drawing the said sections together, the said member when in one position permitting the free sliding movement of the sections relative to each other and also being provided with means for locking the said operating member in position to retain the parts against movement.

A further object of the invention is the provision of a rim tool such as above referred to which will be comparatively simple and inexpensive to manufacture, reliable and efficient in use and readily operated.

With the above and other objects in view, the present invention resides in the novel features of construction, formations, combinations and arrangements of parts to be hereinafter more fully described, claimed and illustrated in the accompanying drawing forming a part of the present application; and in which, Figure 1 is a plan view of the tool applied to a demountable rim of the split type;

Referring now to the accompanying drawing by corresponding characters of reference throughout the several views, the numeral 6 designates in general my improved rim tool, which comprises a pair of bars 7 and 8 the former of which is carried with a substantially U-shaped body portion forming a guide 9 in which the bar 8 is slidably mounted.

Figure 2:
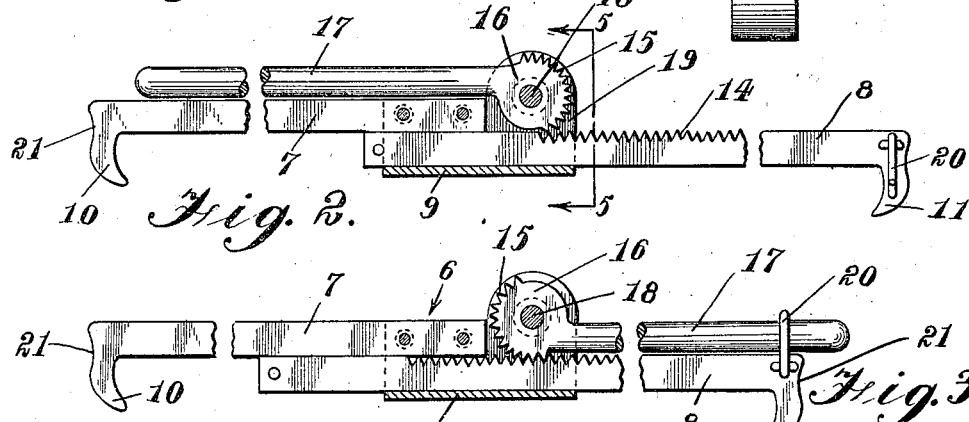
Figure 2 is a longitudinal sectional view of the tool, showing the operating lever in its inoperative position.

The lower edges of the bars are provided adjacent their terminals with gripping members 10 and 11 for engagement with the rim 12 shown in Figure 2 so that the latter can be contracted and the tire 13 removed therefrom.

One edge of the bar 8 is provided at its immediate portion with a plurality of teeth 14, which are engaged by the teeth 15 of the operating head 16 of a lever 17 pivoted as at 18 between the extended ears 19 formed on the sides of the body portion 9.

Figure 3:
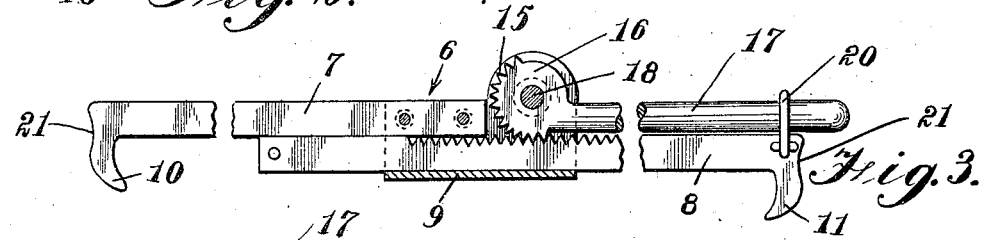
Figure 3 is a similar view showing the same in operative position.

The teeth 15 as clearly shown in the drawing, are of such formation that when the lever is moved to the position shown in Figure 2, the bar 8 will slide relative to the bar 7 for quick adjustment but when the lever is rocked the teeth 15 will mesh with the teeth 14 thus moving the bar 8 with respect to the bar 7 while the bars may be locked in the position shown in Figure 3, through the instrumentality of the latch 20 which engages the free end of the lever 17.

Figure 1:
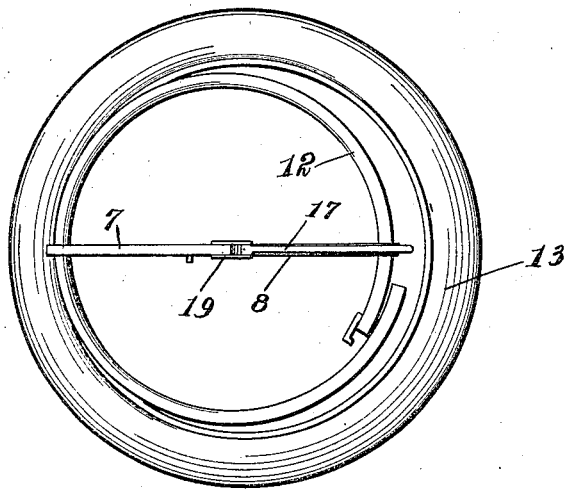
Figure 5:
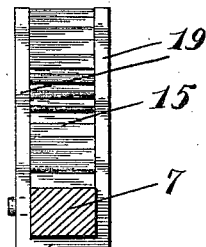
Figure 5 is a transverse sectional view taken on the line 5—5 of Figure 2.
Figure 6:
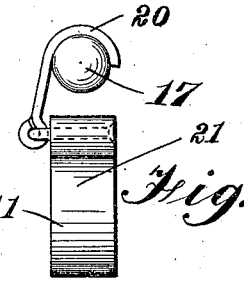
Figure 6 is an end view showing the latch in engagement with the operating lever.
Figure 4:
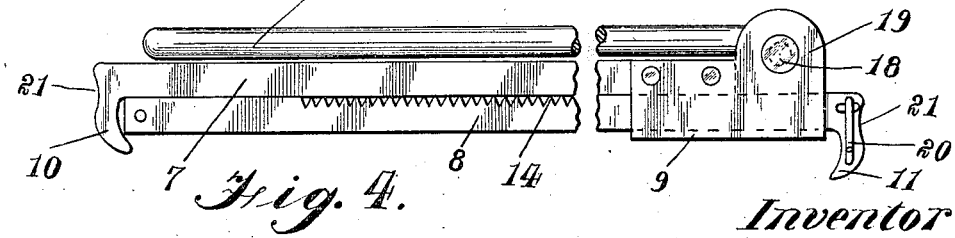
Figure 4 is a side elevation showing the device in its folded position.

In operation the lever is first moved to the position shown in Figure 2 which releases the gripping members 10 and 11 and permits of them being brought into engagement with the opposite sides of the rim 12, thereby adapting the tool for use with varying sizes of rims. It is desired that one of the said gripping members be engaged adjacent the split portion of the rim and the other at a portion on the opposite side of the rim. When the gripping members are adjusted to their proper position, the lever 17 is forced to the position shown in Figure 3 and the latch 20 engaged with the same, which holds the rim in the contracted position shown in Figure 1 and permits the ready removal of the tire therefrom. After the tire has been removed and a second tire is replaced, the lever 17 is released, which permits the rim 12 to expand into engagement with the tire. The device is then adjusted so that the concaved ends 21 will engage the inner side of the rim 12 and the lever is again forced in the direction shown in Figures 1 and 4 which forces the bars 7 and 8 outwardly expanding the rim to its full extent, until the same is locked in the proper manner.

It is desirable that fasteners 22 be employed for securing the inner end of the bar 7 within the body portion 9, so as to brace the sides of the body portion. It is to be noticed also that the bar 7 is so positioned with respect to the medial portion of the body 9 that it coacts with the body in guiding the movement of the bar 8.

From the foregoing description taken in connection with the accompanying drawing, it will be manifest that a rim tool is provided which will fulfil all of the necessary requirements of such a device and it should be understood in this connection that various minor changes in the specific details of construction can be resorted to within the scope of the appended claims without departing from the spirit or sacrificing any of the advantages of the invention.

Having thus fully described the invention, what I claim as new and desire to secure by Letters Patent is:

1. A rim tool of the character described including a body portion of U-shaped configuration, the sides of which are extended to provide ears, a bar rigidly secured between the sides of the body portion in spaced relation to the medial portion thereof and coacting therewith to provide a guide, another bar slidable in the guide and having teeth on one edge and medially of its ends, a lever pivoted at its inner end between the ears of the body portion, a head formed upon the inner end of said lever, teeth formed on one side of the head to permit sliding of the bar and being adapted to engage the teeth on the bar to effect sliding of the bar, gripping members formed on the outer ends of the bars and latch means mounted on one of the members.

2. A rim tool of the character described, including a body portion of U-shaped configuration, the sides of which are extended to provide ears, a bar rigidly secured between the sides of the body portion in spaced relation to the medial portion thereof and co-acting therewith to provide a guide, another bar slidable in the guide and having teeth on one edge, a lever pivoted at its inner end between the ears of the body, a head formed upon the inner end of said lever, teeth formed on the head and adapted to engage the teeth on the bar to effect sliding of said bar.

3. A rim tool of the character described, including a body portion of U-shaped configuration, the sides of which are extended to provide ears, a bar rigidly secured between the sides of the body portion in spaced relation to the medial portion thereof and co-acting therewith to provide a guide, another bar slidable in the guide beneath the first mentioned bar, and having teeth on one edge, a lever pivoted at its inner end between the ears of the body, a head formed upon the inner end of said lever, teeth formed on the head and adapted to engage the teeth on the bar to effect sliding of said bar.

4. A rim tool of the character described, including a body portion having a toothed bar slidable thereon and a fixed bar secured to the body, a segmental gear pivoted to a point immovable relatively to the fixed bar and adapted to engage the toothed bar, a handle for operating said gear, the blank portion of said gear being lowermost when the handle overlies the fixed bar and permitting sliding movement of the slidable bar without interference by the segmental gear.

5. A rim tool of the character described including a body portion having a toothed bar slidable thereon and a second bar fixed to the body, a segmental gear pivoted to said body and adapted to engage the toothed bar, a handle for operating said gear, the blank portion of said gear being lowermost when the handle overlies the fixed bar and permitting sliding movement of the slidable bar without interference by the segmental gear.

In witness whereof I have hereunto set my hand.

ROLAND J. MURRAY.